(12) United States Patent
Shahcheraghi et al.

(10) Patent No.: US 6,532,832 B2
(45) Date of Patent: Mar. 18, 2003

(54) MAGNETOELASTIC TORQUE TRANSDUCER FOR IMPROVED TORQUE MEASUREMENT

(75) Inventors: Roozbeh Shahcheraghi, Västerås (SE); Jarl Sobel, Västerås (SE); Kent Blomkvist, Västerås (SE); Hans Ling, Spånga (SE)

(73) Assignee: ABB AB, Vasteras (SE)

( * ) Notice: Subject to any disclaimer, the term of this patent is extended or adjusted under 35 U.S.C. 154(b) by 0 days.

(21) Appl. No.: 09/955,109

(22) Filed: Sep. 19, 2001

(65) Prior Publication Data

US 2002/0056328 A1 May 16, 2002

(30) Foreign Application Priority Data

Sep. 27, 2000 (SE) .............................................. 0003441

(51) Int. Cl.$^7$ ................................................. G01L 3/02
(52) U.S. Cl. ................................................. 73/862.333
(58) Field of Search ..................... 73/862.331, 862.332, 73/862.333

(56) References Cited

U.S. PATENT DOCUMENTS

| | | | | |
|---|---|---|---|---|
| 5,260,615 A | * | 11/1993 | Sahashi et al. | ................ 310/26 |
| 5,891,586 A | * | 4/1999 | Hasegawa et al. | ........... 428/611 |
| 6,330,833 B1 | * | 12/2001 | Opie et al. | ............. 73/862.333 |

* cited by examiner

*Primary Examiner*—Max Noori
(74) *Attorney, Agent, or Firm*—Dykema Gossett, PLLC

(57) ABSTRACT

A torque transducer for measuring torque transmitted in a rotating as well as a stationary shaft. The torque transducer comprises a transducer shaft 1 arranged with a cylinder-shaped magnetoelastic region 2 fixed to the cylindrical periphery of the transducer shaft, which cylinder-shaped magnetoelastic region is permanently magnetized in the azimuthal direction. The transducer shaft with the cylinder-shaped magnetoelastic region is surrounded by a winding 4 which is supplied by an alternating current. Further, the winding is connected to a phase-sensitive detector 5. According to the present invention, a magnetic and non-linear ferromagnetic material 3' is arranged in physical contact with the cylinder-shaped magnetoelastic region 2. The advantages are that the transducer shaft is manufactured independently of the magnetic properties of the shaft material and may substantially consist of a ferromagnetic material.

16 Claims, 3 Drawing Sheets

MAGNETOELASTIC TORQUE TRANSDUCER FOR IMPROVED TORQUE MEASUREMENT

TECHNICAL FIELD

The need to measure the torque which is transmitted via a shaft exists both for monitoring and control. The need exists within a plurality of different process industries and for other purposes within devices and products. The present invention is a novel type of magnetoelastic torque transducer for contactless measurement of the transmitted torque in a rotating as well as a stationary shaft.

BACKGROUND ART

Generally, a circular cylindrical shaft which is subjected to a torque is influenced by a pure shear stress. This stress state can be expressed, in terms of its principal stresses, as a compressive stress and a tensile stress, directed perpendicularly thereto, of the same magnitude. The principal stress directions are inclined at ±45° to a generatrix to the cylinder surface.

For most modern contactless magnetoelastic torque transducers, the torque measurement is based on the above principle. The torque in these torque transducers is thus measured by measuring the change of the magnetic permeability in a certain direction in the material constituting a transducer shaft.

The most commonly used torque measurement which makes use of this is designed such that, within a measurement range of the shaft, a rotationally symmetrical, homogeneous magnetizing field, that is, an H-field, is created with the aid of a surrounding stationary excitation winding. This results in an equally homogenous magnetic flux density, that is, a B-field, in the shaft in unloaded state. When the shaft is loaded, the field configuration of the B-field is distorted, which can be detected with the aid of detection windings.

The state of the art as regards the constructive design of torque transducers based on the above method is disclosed in a number of patent specifications. Common to most of these solutions is that two zones are created in the magnetic material, with some type of anisotropy, which causes the magnetic flux density to be deflected at an angle away from its natural direction in parallel with the generatrices to the cylinder surface of the transducer shaft.

SU 667836 describes a method in which the anisotropy is created purely geometrically in each zone by cutting grooves in the surface of the shaft according to a specific pattern. This pattern consists of a number of mutually parallel lines directed at an angle of 45° to a generatrix to the cylinder surface of the transducer shaft.

U.S. Pat. No. 4,823,620 describes the same embodiment as above with respect to the geometrical anisotropy, however with the addition that the surface of the shaft is hardened or carburized for the purpose of reducing the hysteresis in the transducer. Both of these methods have their limitations. The methods presuppose that full rotational symmetry of the anisotropic patterns is achieved. The shaft must also be machined to achieve the desired magnetic anisotropy.

Another magnetoelastic method for measuring the torque in a shaft is clear from EP 0 525 551 A2. The shaft whose torque is to be measured is provided with a circularly polarized magnetoelastic ring which is pressed, shrunk or glued onto the shaft. When applying torque to the transducer shaft, the shaft, and hence the ring, will be distorted. This results in the originally purely azimuthal magnetization being reoriented in a helical pattern with both an azimuthal and an axial component. With the aid of a Hall element, freely mounted relative to the shaft, which is oriented in such a way that the Hall element only senses the axial component of the magnetization, a measure of the torque occurring in the shaft is obtained.

Using a Hall element according to the above entails several disadvantages. On the one hand, a Hall element will measure the field at one point only along the circumference of the ring. When the transducer shaft rotates, and hence also the circularly polarized magnetic ring, the output signal from the Hall element will vary unless the magnetic field of the ring has a perfect rotational symmetry. Another disadvantage is that Hall elements have very small signal levels, which makes the signal processing difficult and makes the signal sensitive to electrical interference. In addition, Hall elements have a temperature drift which is not unessential.

In patent application WO 9722866A1, a torque transducer comprising a shaft with a circularly polarized ring is described. The ring is concentrically surrounded by a stationary tubular shell, freely mounted in relation to the shaft, which shell is provided with a winding for magnetization of the shell with a given frequency. A phase-sensitive detector connected to the winding supplies a signal corresponding to the content of the voltages with even harmonics, induced in the winding, for the purpose of measuring the axial component of the magnetic field.

One difficulty with the above solution is that a large part of the axial magnetic flux, which arises in the ring when loading a torque transducer shaft, will inevitably complete the circuit through the transducer shaft in the case of magnetic transducer shaft material. This then implies that the static magnetic flux mentioned, which is intended for generating even harmonics of the time-varying flux in the shell above it, will substantially not reach to the shell.

An accurate measurement of the transmitted torque may be relatively difficult to achieve in the case of rotating shafts since the accuracy may be influenced if the outer shell does not possess a sufficiently large degree of rotational symmetry. In addition, the choice of transducer shaft material is dependent on the magnetic properties of the material and is, in practice, limited to paramagnetic materials only.

SUMMARY OF THE INVENTION

One object of the present invention is to achieve a torque transducer for which the choice of transducer shaft material is independent of the magnetic properties of the material. Another object of the invention is to design a torque transducer whose transducer shaft may comprise a ferromagnetic material.

Another object of the invention is to arrange a torque transducer by means of which the axial dc field, which arises in the ring when loading the circularly polarized ring, is utilized more efficiently for generating even harmonics of the flux in the magnetic shell.

Still another object is to arrange a shell and a transducer shaft of a torque transducer in such a way that the angular dependence of the transducer signal becomes minimal. An additional object of the invention is to arrange a torque transducer in which the power losses, due to air leakage in the high-reluctance air path outside the excitation winding of the transducer, are reduced.

Yet another object of the invention is to arrange a torque transducer by means of which a good accuracy of measurement can always be obtained, also when the magnetic field in the magnetoelastic ring has a moderate degree of rotational symmetry. When measuring the transmitted torque in, for example, a rotating shaft, it is of great importance that the accuracy of measurement should be independent of any rotational symmetry of the mentioned magnetic field.

These and other objects are fulfilled according to the invention by a torque transducer for measuring the transmitted torque in a rotating as well as a stationary shaft according to claim 1. Further, some advantageous embodiments of the present invention are described in claims 2–14. The present invention relates to a torque transducer which is arranged such that the transducer shaft is manufactured of an arbitrary material independently of the magnetic properties of the material.

According to the prior art, when applying torque to the transducer shaft, a static magnetic axial flux arises in the transducer ring. The static magnetic axial flux completes the circuit through the air above the ring and through the shaft material below the ring. The proportion of magnetic flux which completes the circuit through the air is approximately proportional to the quotient between the relative magnetic permeability in the air and in the shaft material, respectively.

For non-magnetic materials, with largely the same relative permeability as that of the air, this leads to the return flux substantially completing the circuit in equal parts through the air and the shaft. This implies that only half of the static magnetic flux, the dc flux, is available to interact, in the shell, with the time-varying flux, the ac flux, from the excitation winding for the purpose of inducing even harmonics in the ac flux for measurement. If a torque transducer shaft according to the prior art is made of a ferromagnetic material, the proportion of dc flux in the shell intended for inducing measurable voltages, with even harmonics, will decrease considerably.

The present invention has the advantage that the transducer shaft may be made of an arbitrary material, independently of the magnetic properties of the material, substantially by placing a highly permeable magnetic layer of a magnetic non-linear material with a high relative permeability arranged in physical contact with the cylinder-shaped magnetoelastic region on the transducer shaft. The result of this is that the static magnetic flux, the dc flux, effectively completes the circuit through the magnetic layer since the flux, compared with torque transducers according to the prior art, does not have to be conducted through the air. This, in turn, causes most of the axial static magnetic flux, which upon loading is generated by a magnetic circularly polarized and cylinder-shaped region on the transducer shaft, to be controlled towards the time-varying magnetic flux in the layer, the ac flux, generated by the excitation winding. Because of this, the dc field in the present invention is used in a much more efficient way than according to the prior art.

Torque transducers according to the preferred embodiment, where the transducer shaft may also comprise ferromagnetic materials, are more advantageous for a number of reasons.

One advantage of the present invention is that the transducer shaft may be manufactured from optional construction materials. The term optional materials here means that the shaft on which the torque is to be measured, such as a spindle in a steering gear, a shaft in a gearbox, a drive shaft or a spindle, etc., is manufactured from a material which has the desired material properties to efficiently achieve the objects and performance of the object. A transducer shaft of a ferromagnetic material means that a torque transducer according to the present invention has a considerably wider range of application. In most cases, the use of a ferromagnetic material also entails lower material costs, which in turn involves lower production costs for the transducer as a whole.

Another advantage of a preferred embodiment of the present invention is that the measuring zone of such a transducer shaft need not be machined or processed separately to receive special magnetic properties. Another embodiment of the invention has the advantage that no magnetic circularly polarized ring need be attached to the transducer shaft. According to this embodiment, a substantially cylinder-shaped and magneto-strictive region of the transducer shaft material is provided with a higher magnetic relative permeability for circular polarization, such that the use of a separate ring according to the prior art can be eliminated.

According to the best use of the present invention, an embodiment of the invention is used where the winding is provided with a magnetic return conductor. Such a configuration entails a considerably lower power consumption compared with a corresponding configuration for a torque transducer according to the prior art, which is a significant advantage.

BRIEF DESCRIPTION OF THE DRAWINGS

The present invention will be described in greater detail with reference to the accompanying schematic drawings.

DESCRIPTION OF THE PREFERRED EMBODIMENTS

Figure 1:
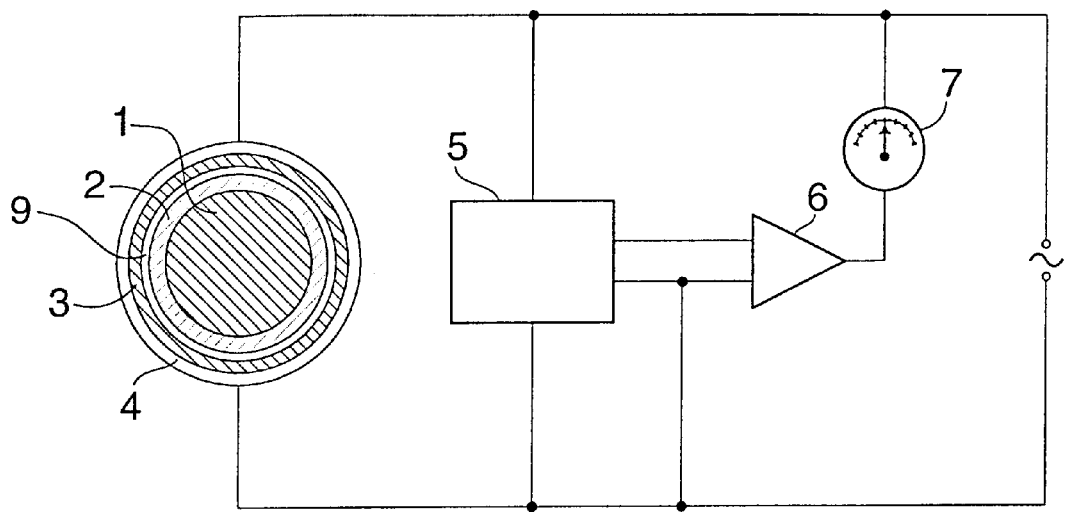
FIG. 1 shows a schematic view of a torque transducer according to the prior art.
Figure 2:
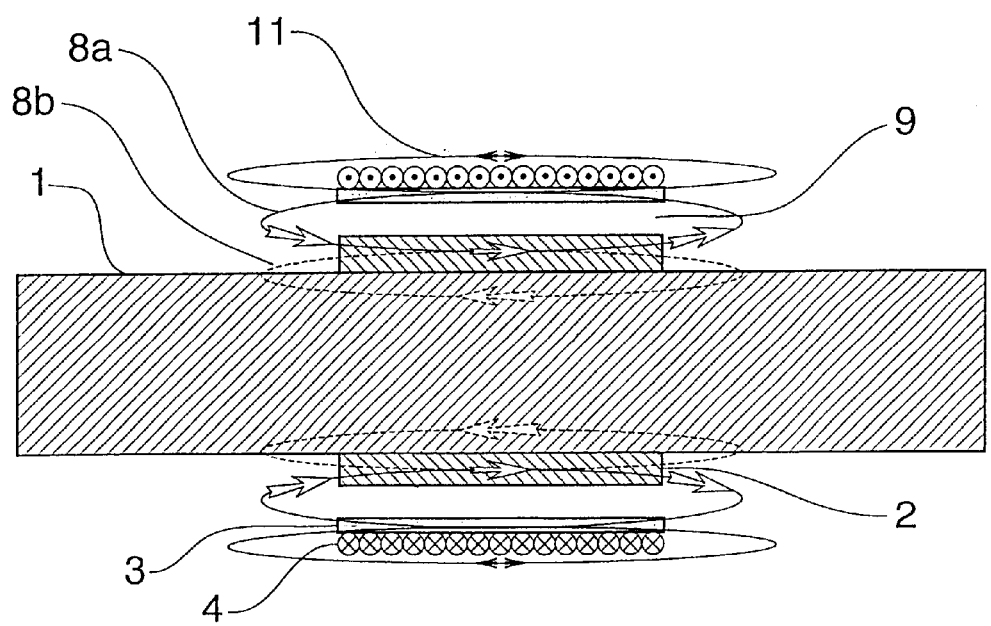
FIG. 2 shows another view with a section of the torque transducer along the longitudinal axis of the transducer shaft according to the prior art.

To describe the present invention, a transducer according to the prior art will first be described. FIG. 1 shows a torque transducer according to the prior art, comprising a shaft 1, a ring 2, a cylinder-shaped shell 3 and one or more windings 4. The shell 3 consists of a non-linear magnetic material with a large relative permeability. The winding 4 surrounds the shell 3. The ring 2 is made of a magnetic material with a large magnetic relative permeability and is arranged such that a static magnetic field completes the circuit through the ring in the azimuthal direction. The fact that the transducer is contactless requires that a non-insignificant air gap 9 arises between the magnetoelastic region 2 (the ring) and the shell 3. FIG. 2, which also shows the torque transducer according to the prior art, shows an additional representation of static magnetic-field lines 8a from the ring 2 when the ring is loaded.

A phase-sensitive detector 5, shown in FIG. 1, is connected to a current-feed circuit which supplies the measuring coil 4 with alternating current. The detector 5 generates a signal to a controller 6 which sends a direct current to the measuring coil 4 to counteract the effect of the static magnetic field which arises in the shell 3 upon loading. A polarized measuring instrument 7, through which direct current is passed, is used to show—after suitable calibration—the magnitude of the torque transmitted in the transducer shaft. This is described in detail in the above-mentioned patent application WO 722866A1.

The torque transducer according to the prior art comprises the circularly polarized ring 2 attached to the transducer shaft 1. The field lines 8a show how the magnetic field generated by the ring 2 gives rise to a magnetic flux through the air in the air gap 9 to the cylinder-shaped shell 3 for sensing through the winding 4. The field lines 8a also flow, to a larger or smaller extent, through the shaft 1. The dashed line 8b shows how a certain part of the magnetic flux from the ring, that is 8b, completes the circuit through the shaft.

Figure 3:
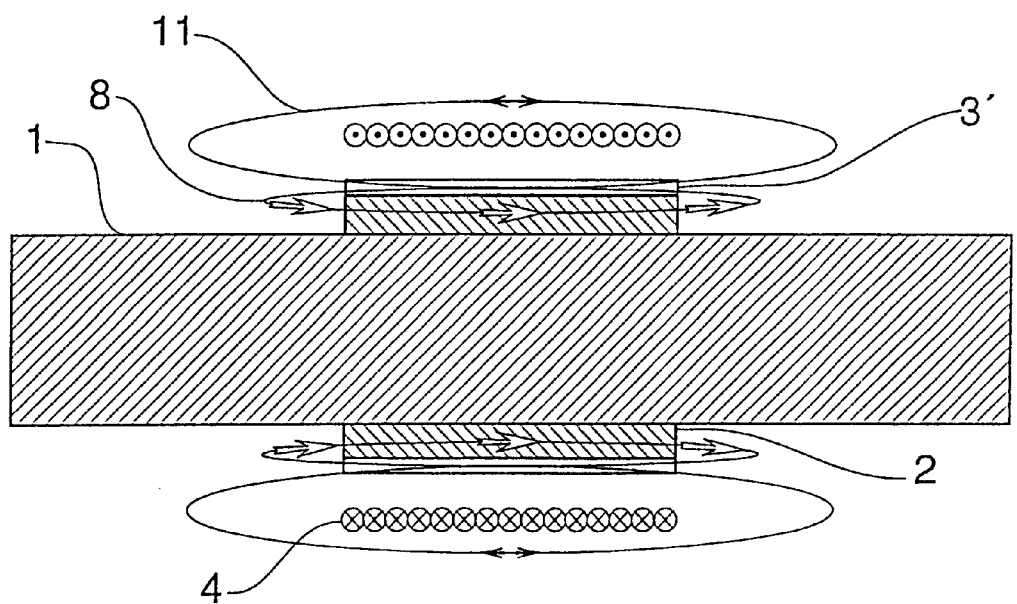
FIG. 3 shows a schematic section of a preferred embodiment of a torque transducer according to the invention with a ferromagnetic shaft.

FIG. 3 shows a view of the preferred embodiment according to the present invention. A ferromagnetic layer 3' is fixed to the circularly polarized ring 2. The layer 3' comprises a magnetic non-linear material with a large relative permeability, a relative permeability greater than 1000 and preferably of the order of magnitude of up to 10,000 or more. It is glued, shrunk, or in some other way fixed to the outer surface of the ring 2.

The present invention is arranged such that, when the shaft 1 is loaded with the torque, a static magnetic field is generated in the axial direction by the circularly polarized ring 2. The layer 3' which surrounds the ring 2 influences the flux lines 8 of the static magnetic field, because the magnetic relative permeability of the layer is more than one order of magnitude greater than the corresponding relative permeability of an ordinary shaft made of ferromagnetic material. The result of this influence is that the flux density of the static magnetic field in the cylinder-shaped layer 3' is considerably larger. This, in turn, leads to an increase of the content of even harmonics in the voltage induced across the sensing winding 4. This results in increased sensitivity of the transducer and hence an increased accuracy of measurement. In other words, any flux lines corresponding to the flux lines 8b in FIG. 2 would be significantly reduced, if they occur at all, although the material of the transducer shaft is ferromagnetic.

In a preferred embodiment, the transducer shaft is made of a ferromagnetic material, for example ordinary steel, with or without a conventional surface treatment such as phosphate treatment, zinc treatment, etc. The layer 3' comprises a metal with a composition or an alloy selected such that the layer is given a magnetic relative permeability of, for example, the order of magnitude of 10,000 and more. A good useful example is a foil material known under the name of Vitrovac 6025X (trademark) with a relative permeability of approximately 100,000. Examples of other alloying materials, which have proved to be effective during tests, are:

- a few amorphous, cobalt-based alloys of various types known under the general name Vitrovac (trademark);
- a crystalline, iron-based alloy with a large relative permeability, for example mumetal;
- an amorphous, iron-based alloy known under the name of Metglas (trademark).

Alloys as mentioned above comprise a few transition metals, for example cobalt, iron, nickel. A cobalt-based alloy such as Vitrovac 6025X has an additional advantage in that it is not magnetostrictive. This implies that the measuring signal is stable independently of the mechanical load of the layer or when the ambient temperature changes.

Figure 4:
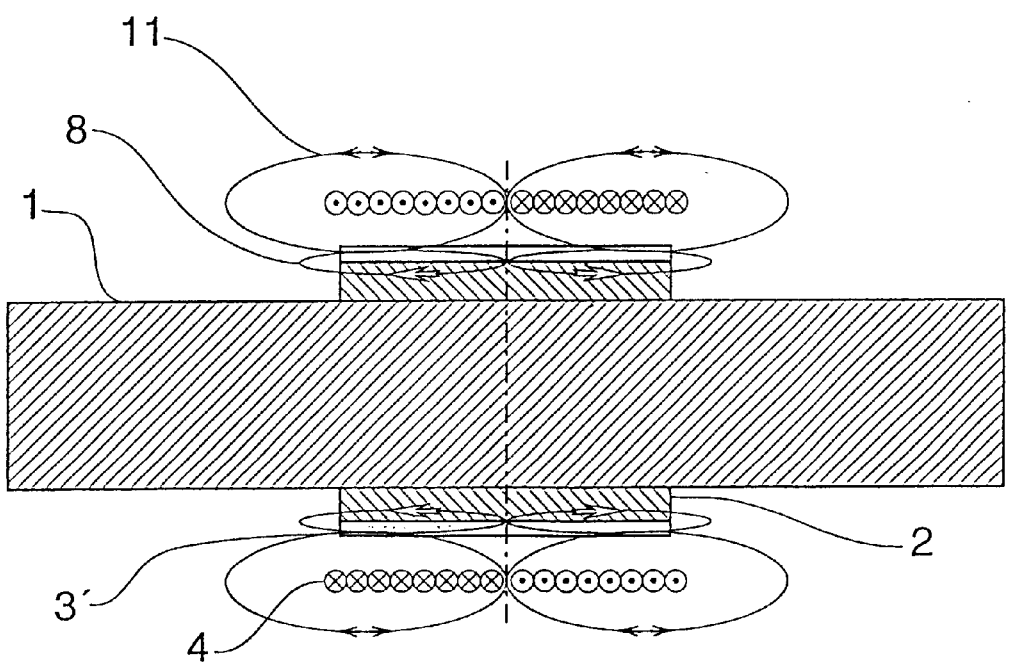
FIG. 4 shows an alternative embodiment of a torque transducer according to the invention with a ferromagnetic shaft and with two measuring zones.

A further development of the preferred embodiment shows a method of counteracting the influence of external static interference fields. A sufficiently strong external static interference field, or a low-frequency time-varying magnetic field, may disturb the accuracy and, for example, cause the torque transducer to become sensitive to the way in which the axial direction of the torque transducer is oriented relative to the external interference field. FIG. 4 shows a torque transducer with the measuring region arranged in two zones. The two zones are arranged such that both the static field 8 and the time-varying magnetic field 11 at any time are directed in opposite directions in the two zones. The axial component of an external interference field in this way receives a resultant which approaches zero.

In another embodiment, the function of the ring 2 is performed by of a highly permeable, non-liner ferromagnetic region which consists of a small part of the material of the transducer shaft. Such a region is created with a suitable treatment, such as a plating method to coat a plated layer with magnetic properties similar to those of the ring. It may also be created by surface treatment to absorb an alloying element or a compound in the region. Further, a heat-treatment method may be used to achieve advantageous changes of the microstructure in the region. In this way, a substantially cylinder-shaped and magnetostrictive region is created on the transducer shaft which has a considerably greater magnetic relative permeability than the surrounding shaft material. The magnetostrictive region mentioned is then subjected to permanent magnetization in order to create a static circularly polarized magnetic field which acts in the same way as the circularly polarized ring made of a different material.

In an alternative embodiment of the present invention, the transducer shaft is made of a paramagnetic metal or alloy.

Figure 5:
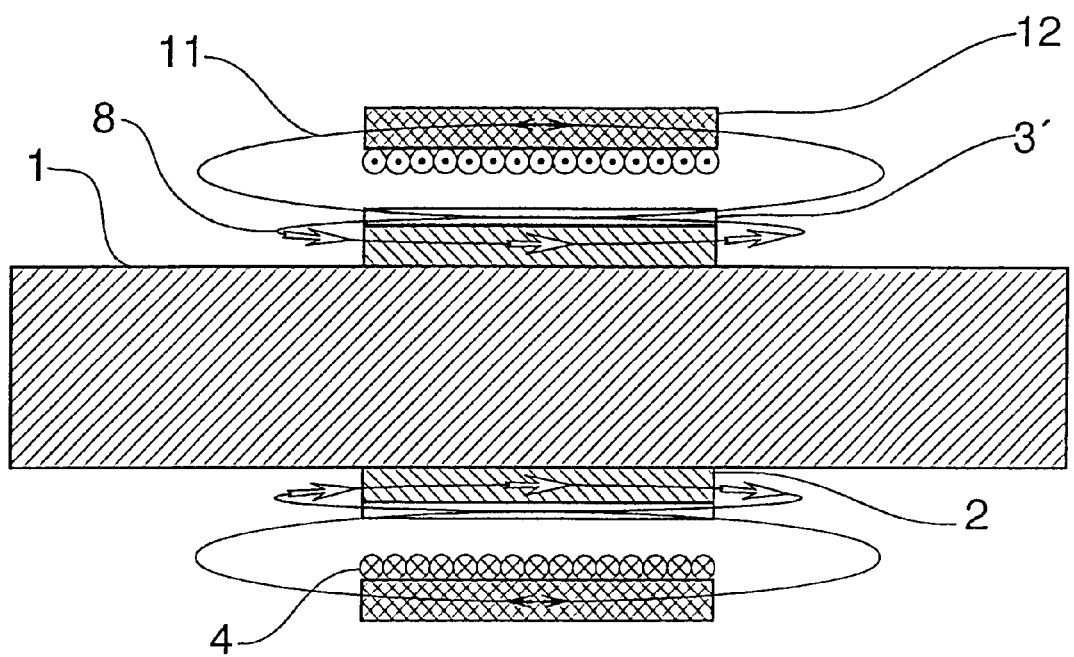
FIG. 5 shows an alternative embodiment of a torque transducer according to the invention with a measuring coil which is further developed for low power consumption.

The best use of a torque transducer according to the present invention is shown in FIG. 5. This design is particularly well suited for a torque transducer according to the invention which has an additional advantage in the form of a low power consumption. By supplying the measuring coil 4 with alternating current, a magnetic alternating field is created in the layer 3', as shown by the field lines 11. According to the best use, an additional layer 12 is fixed to the outer side of the measuring coil 4. The layer 12 consists of a magnetic linear material. Its function is to conduct that part of the flux lines 11 which would otherwise usually flow through the air outside the measuring coil, in order to complete the magnetic circuit in a simpler manner. In that way, magnetic fields are maintained in the air gap 9, between the measuring coil 4 and the layer 3', by a lower current intensity in the measuring coil, which entails a lower power requirement of the transducer. During testing, it has been found that the power consumption in the measuring coil may be drastically reduced in this way. A test result, for example, showed a reduction of the total consumed supply power from 1.4 W to 120 mW, that is, approximately by a factor of 12.

What is claimed is:

1. A torque transducer comprising a transducer shaft arranged with a cylinder-shaped magnetoelastic region at the cylindrical periphery of the transducer shaft, which cylinder-shaped magnetoelastic region is permanently magnetized in the azimuthal direction and surrounded by at least one winding which is fed by an alternating current, which winding in turn surrounds a cylinder-shaped layer in the form of a shell consisting of a highly permeable and non-linear ferromagnetic material for generating even harmonics, characterized in that a layer of said highly permeable and non-linear ferromagnetic material arranged in physical contact with the cylinder-shaped magnetoelastic region.

2. A torque transducer according to claim 1, wherein the transducer shaft comprises ferromagnetic material.

3. A torque transducer according to claim 2, wherein said layer is arranged relative to the cylinder-shaped magnetoelastic region so as to rotate together therewith.

4. A torque transducer according to claim 3, wherein said layer comprises a material with a magnetic relative permeability considerably greater than the relative permeability of the cylinder-shaped magnetoelastic region.

5. A torque transducer according to claim 4, wherein said layer comprises a material with a magnetic relative permeability greater than 1000.

6. A torque transducer according to claim 5, wherein the layer comprises any of an amorphous cobalt-based alloy, an amorphous iron-based alloy, a crystalline iron based alloy.

7. A torque transducer according to claim 1, wherein the cylinder-shaped magnetoelastic region comprises part of the material of the transducer shaft.

8. A torque transducer according to claim 7, wherein the cylinder-shaped magnetoelastic region has a magnetic relative permeability considerably greater than that of the surrounding material of the shaft.

9. A torque transducer according to claim 8, wherein the cylinder-shaped magnetoelastic region of the transducer shaft is created by means of a plating method.

10. A torque transducer according to claim 8, wherein the cylinder-shaped magnetoelastic region of the transducer shaft is created by means of a heat-treatment method.

11. A torque transducer according to claim 1, wherein the winding is surrounded by a material substantially in the form of an outer layer of a magnetic linear material with a relative permeability greater than that of the material of the transducer shaft and preferably equal to that of the layer.

12. A torque transducer according to claim 1, wherein the layer of said highly permeable and nonlinear ferromagnetic material are means for generating even harmonics in the magnetic flux through the layer and hence also in the induced voltage across the winding.

13. A torque transducer according to claim 1, wherein the transducer shaft comprises a measuring region arranged in at least two measuring zones in such a way that the magnetic field in at least one measuring zone is directed in a direction opposite to that of the magnetic field in the other measuring zone.

14. A torque transducer according to claim 1, wherein the transducer shaft substantially comprises a paramagnetic material.

15. Use of a torque transducer according to claim 1, for measuring torque transmitted in a stationary shaft.

16. Use of a torque transducer according to claim 1, for measuring torque transmitted in a rotating shaft.

* * * * *